(12) United States Patent
Ohtani et al.

(10) Patent No.: US 7,980,137 B2
(45) Date of Patent: Jul. 19, 2011

(54) DUAL PRESSURE SENSOR

(75) Inventors: Hideo Ohtani, Tokyo (JP); Motohiro Furuya, Tokyo (JP)

(73) Assignee: Yamatake Corporation, Tokyo (JP)

( * ) Notice: Subject to any disclaimer, the term of this patent is extended or adjusted under 35 U.S.C. 154(b) by 30 days.

(21) Appl. No.: 12/670,035

(22) PCT Filed: Jul. 23, 2008

(86) PCT No.: PCT/JP2008/063161
§ 371 (c)(1),
(2), (4) Date: Jan. 21, 2010

(87) PCT Pub. No.: WO2009/014134
PCT Pub. Date: Jan. 29, 2009

(65) Prior Publication Data
US 2010/0218612 A1    Sep. 2, 2010

(30) Foreign Application Priority Data

Jul. 24, 2007 (JP) .................................. 2007-192378

(51) Int. Cl.
*G01L 13/02* (2006.01)
(52) U.S. Cl. ........................................... 73/716; 73/736
(58) Field of Classification Search .................. None
See application file for complete search history.

(56) References Cited

U.S. PATENT DOCUMENTS

| 4,131,088 | A |   | 12/1978 | Reddy |
| 4,177,680 | A | * | 12/1979 | Coleman .......................... 73/718 |
| 6,000,427 | A | * | 12/1999 | Hutton ........................... 137/597 |
| D427,931  | S | * | 7/2000  | Hutton ........................... D10/121 |
| 7,497,124 | B2 | * | 3/2009 | Kuznia et al. ................... 73/714 |
| 2006/0016266 | A1 |   | 1/2006 | Weise et al. |
| 2008/0257052 | A1 | * | 10/2008 | Kuznia et al. ................... 73/700 |

FOREIGN PATENT DOCUMENTS

| JP | 53-058279 A | 5/1978 |
| JP | 5-034229 A | 2/1993 |
| JP | 05-052691 A | 3/1993 |
| JP | 09-133599 A | 5/1997 |
| JP | 2006-071628 A | 3/2006 |

* cited by examiner

*Primary Examiner* — Andre J Allen
(74) *Attorney, Agent, or Firm* — McDermott Will & Emery LLC

(57) ABSTRACT

A dual pressure sensor using a reduced number of parts to simplify its structure and having increased ease of assembly and improved air tightness. The dual pressure sensor has an airtight container, two pressure sensor units received in the airtight container so as to be in intimate contact with each other and a substrate. The pressure sensor units has two bases, two pressure sensing diaphragm chips, and an output correction circuit. The pressure sensing diaphragm chips are secured to the bases, respectively. The bases are constructed respectively from base bodies having communication paths formed inside them and also respectively from pressure introduction sections integral with and projecting from the base bodies. The pressure introduction sections respectively project outward from insertion holes formed in the airtight container.

18 Claims, 3 Drawing Sheets

DUAL PRESSURE SENSOR

CROSS REFERENCE TO RELATED APPLICATIONS

This is the U.S. National Phase Application under §371 of International Application No. PCT/JP2008/063161, filed Jul. 23, 2008, which claims the benefit of Japanese Application No. 2007-192378, filed Jul. 24, 2007 each of which is hereby incorporated by reference in its entirety herein. The International Application was published in the Japanese language on Jan. 29, 2009 as WO 2009/014134 A1 under PCT Article 21(2).

FIELD OF THE INVENTION

The present invention relates to a dual pressure sensor for detecting, through two sensor units, two pressures to be measured.

BACKGROUND OF THE INVENTION

There is a known "Semiconductor Pressure Sensor," disclosed in, for example, Japanese Unexamined Patent Application Publication H5-52691, which is hereby incorporated by reference in its entirety, as a dual pressure sensor for measuring a pressure between two points. The semiconductor pressure sensor measures the differential pressure in fluids by detecting two pressures separately using respective pressure-sensitive diaphragm chips and then subtracting these measured pressures. Because of this, the semiconductor pressure sensor is provided with not only two pressure-sensitive diaphragm chips, but also with an airtight container for sealing the chip airtightly, and a substrate, whereon are disposed each of the pressure-sensitive diaphragm chips, provided within the airtight container. A shared pressure reference chamber for the two pressure-sensitive diaphragm chips is formed within the airtight container. The outputs of the individual pressure-sensitive diaphragm chips are connected to the outside of the airtight container through terminals. The substrate is provided with two pressure connecting tubes that connect the pressures to be measured to the respective pressure-sensitive diaphragm chips.

However, the semiconductor pressure sensor disclosed in Japanese Application Publication H5-52691 is structured from many components: two pressure connecting tubes for connecting to the fluid to be measured, two pressure-sensitive diaphragm chips for measuring the respective pressures to be measured, a substrate upon which the individual pressure-sensitive diaphragm chips are mounted, and two terminals for connecting electrically the respective pressure-sensitive diaphragm chips through wire bonding. Because of this, the component count is high, and thus there is a problem in that the assembly operations are time-consuming, and the efficiency of the assembly operations is low.

In addition, because, in particular, the two pressure-sensitive diaphragm chips are disposed in common on a single substrate, if either of the pressure-sensitive diaphragm chips fails for some reason, both of the chips must be replaced by the substrate unit, or in other words, the entire unit must be replaced. This means that the pressure-sensitive diaphragm chip that is functioning normally must be discarded, which is uneconomical. Additionally, the two pressure guide tubes must be fabricated separately and attached passing through a lid portion of the airtight container, and thus there is a problem in that this requires an attachment with a high level of airtightness.

SUMMARY OF THE INVENTION

The present invention is to solve the conventional problems set forth above, and the object thereof is to provide a dual pressure sensor capable of improving the assembly operability and airtightness along with enabling simplification through the reduction of the component counts.

The dual pressure sensor as set forth in the present invention, by which to achieve the object set forth above, comprises an airtight container having two through paths and having a pressure reference chamber formed on the inside thereof; and two pressure sensor units, disposed arranged lined up within the pressure reference chamber, for detecting two pressures to be measured; wherein: the two pressure sensor units each comprise respective substrates and respective pressure-sensitive diaphragm chips for detecting respective pressures to be measured by converting into electrical signals displacements of diaphragms due to the respective application of the pressures to be measured; and the substrate of each individual pressure sensor unit comprises: a substrate main unit that has a small hole and has a connecting duct formed therein, and wherein a pressure-sensitive diaphragm chip is secured so as to block the small hole; and a pressure connecting portion, provided formed integrally with the substrate main unit and protruding therefrom, having a pressure connecting hole for connecting to the connecting hole, wherein one end extends to the outside of the airtight container from the through paths, to connect the individual pressure to be measured through the connecting duct to the diaphragm of the pressure-sensitive diaphragm chip.

In the present invention, the pressure connecting portion may be integrated with the substrate, making it possible to reduce the number of components, enabling the sensor to be simplified, facilitating the sensor assembly operations, and enabling an improvement in the ease of assembly operations. Additionally, the pressure connecting portion need not be secured to an airtight container, and all that is necessary is for the pressure connecting portions to penetrate through a seal material at the through holes, enabling the assembly of the seal structure between the pressure connecting portion and the through holes to be simplified, enabling an improvement in productivity. Additionally, because the two pressure sensor units are independent of each other, if either of the pressure sensor units were to fail, then there would be no need to change the entirety of the dual pressure sensor, but rather only that particular pressure sensor unit need be replaced with a new pressure sensor unit.

BRIEF DESCRIPTION OF THE DRAWINGS

The foregoing and other features of the present invention will be more readily apparent from the following detailed description and drawings of illustrative embodiments of the invention in which.

Like reference numerals are used in the drawing figures to connote elements of the invention.

DETAILED DESCRIPTION OF THE INVENTION

Figure 1A:
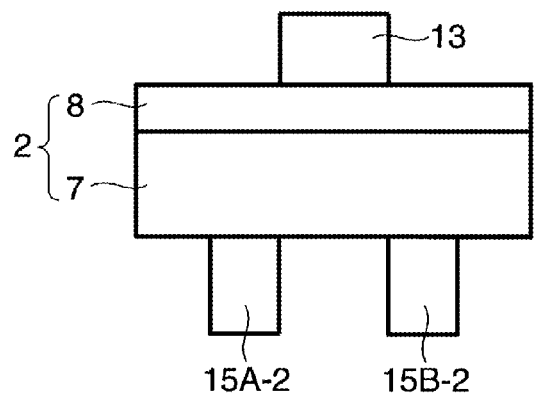
FIG. 1A is a front view of a dual pressure sensor as set forth in the present invention.
Figure 1B:
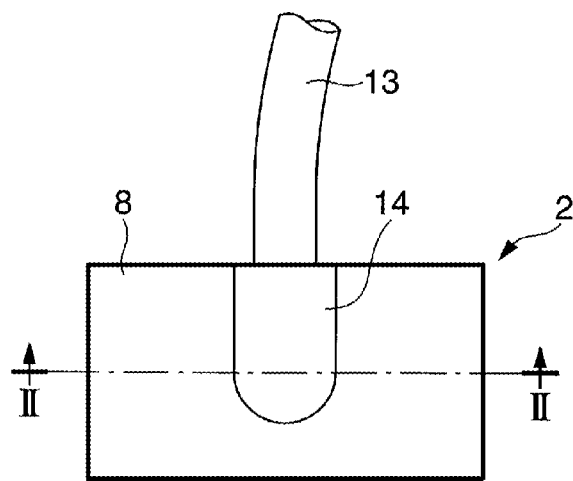
FIG. 1B is a plan view of a dual pressure sensor as set forth in the present invention.
Figure 1C:
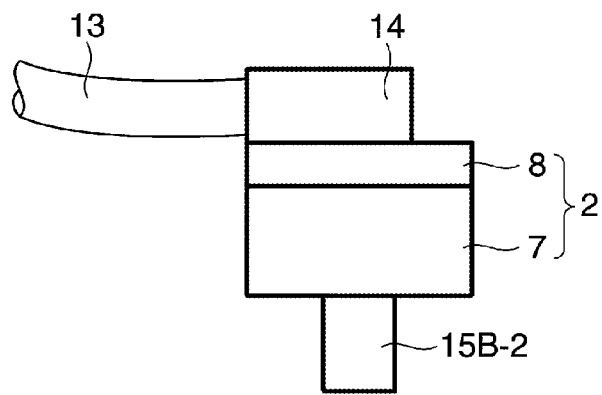
FIG. 1C is a side view of a dual pressure sensor according to the present invention.
Figure 2:
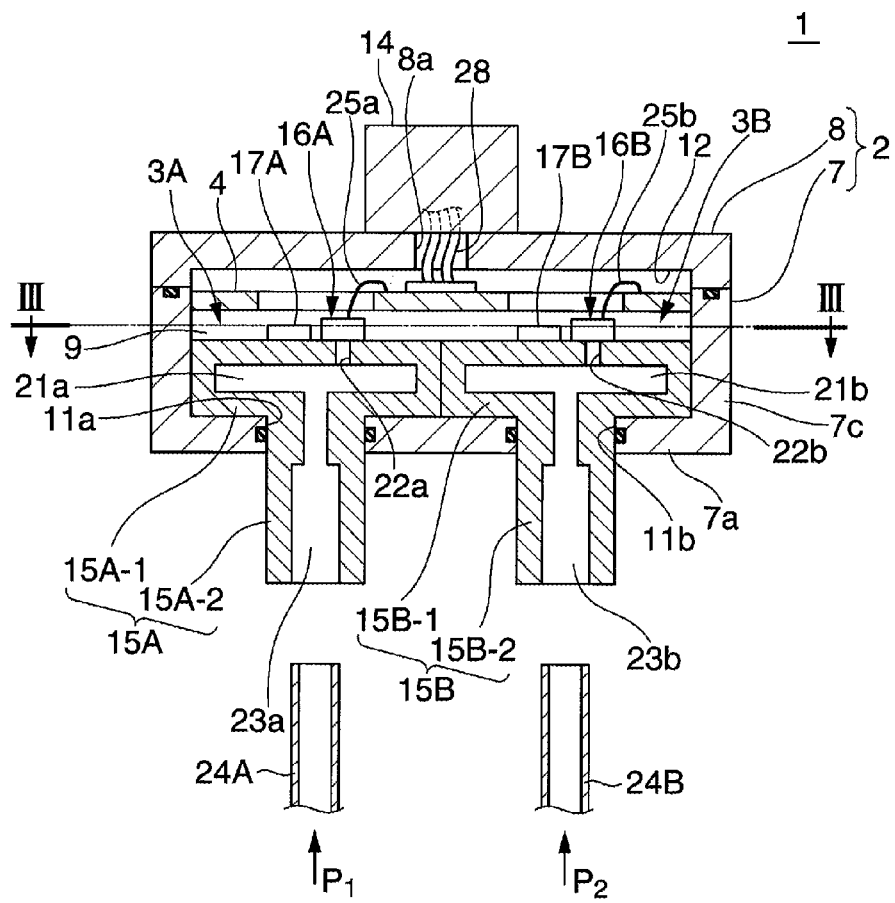
FIG. 2 is a cross-sectional diagram along the section II-II of FIG. 1B.

The present invention will be explained in detail based on the example of embodiment illustrated in the drawings. In FIG. 1A through FIG. 1C, FIG. 2, and FIG. 3, the dual pressure sensor 1 comprises: an airtight container 2; two pressure sensor units 3A and 3B that are housed within the airtight container 2; a substrate 4; and the like.

The airtight container 2 is structured from a case 7 that is made out of a synthetic plastic, or the like, in the shape of a box that has a bottom but that is open at the top, and a lid 8 that covers, airtightly, the top opening portion of the case 7, made out of the same synthetic plastic, or the like. Within the airtight container 2 is formed a pressure reference chamber 9 shared by the two pressure sensor units 3A and 3B. The case 7 is formed as a rectangular box, open at the top, having a bottom panel 7a, and side panels 7b through 7b that are provided integrally along each edge of the bottom plate 7a, where the ratios of the lengths of two intersecting sides are essentially 2 to 1. In the case 7 there are two pressure sensor units 3A and 3B that are arranged in intimate contact with each other. Triangular prism positioning protruding portions 10 for positioning and preventing the movement of the respective pressure sensor units 3A and 3B are provided in each of the core portions of the inner surfaces of the case 7 and in the center portions in the lengthwise direction of the inner surfaces of the opposing long-edge side panels 7d and 7e. Two through holes 11a and 11b are formed corresponding to the respective pressure sensor units 3A and 3B on the bottom panel 7a.

The lid 8 is formed in the shape of a flat panel having a shallow indented portion 12 on the bottom surface thereof, and is secured to the top surface of the case 7 through screws through a seal material, not shown, to seal the top surface open portion of the case 7 airtightly. In the center of the lid 8 is formed a through hole 8a through which the outside signal line 13 passes to the outside. Additionally, in the center of the top surface of the lid 8 is provided a connector portion 14 that closes the through hole 8a airtightly and to which is connected one end of the outside signal line 13.

The pressure sensor unit 3A is structured from a substrate 15A, a pressure-sensitive diaphragm chip 16A, and an output correcting circuit 17A.

The substrate 15A is formed as a single unit from a synthetic plastic, formed from a substrate main unit 15A-1 and a pressure connecting portion 15A-2 that is provided integrally and protruding from the center portion of the bottom surface of the substrate main unit 15A-1. The substrate main unit 15A-1 is formed in a thin box shaped which, in its planar view, is rectangular, and which essentially matches half the size of the interior shape of the case 7. In the inside of the case 7 is formed a connecting duct 21a. On the top surface of the case 7 is formed a small hole 22a for connecting the pressure to be measured $P_1$ to the pressure-sensitive diaphragm chip 16A. The corner portions of the substrate main unit 15A are cut away at a 45° angle so as to fit tightly with the side surfaces of the positioning protruding portions 10. The substrate main unit 15A-1 is formed so as to be large, to cause the volume of the connecting duct 21a to be large. The reason for causing the volume of the connecting duct 21a to be large is to absorb the sudden variations in pressure of the pressure to be measured $P_1$ to thereby prevent the diaphragm of the diaphragm chip 16A from being damaged due to sudden variations in pressure.

The pressure connecting portion 15A-2 is formed in a cylindrical shape, and the bottom end portion thereof protrudes to the outside of the case from the hole 11a of the case 7. On the inside of the pressure connecting portion 15A-2 is formed a pressure guiding hole 23a for connecting the pressure to be measured $P_1$ to the pressure-sensitive diaphragm chip 16A through the connecting duct 21a of the substrate main unit 15A-1 and to the small hole 22a.

A semiconductor pressure sensor is used as the pressure-sensitive diaphragm chip 16A. Because of this, the pressure-sensitive diaphragm chip 16A is provided with a semiconductor substrate (silicon) wherein is formed a thin the pressure-sensitive portion (diaphragm), and a diffusion-type deformation gauge for detecting and converting into a signal the deformation, due to the pressure to be measured $P_1$, of the diaphragm, using the piezoresistance effect, formed through impurities, or through an ion implantation technique, in the semiconductor substrate. This type of pressure-sensitive diaphragm chip 16A is known through, for example, Japanese Unexamined Patent Application Publication H06-213743, which is hereby incorporated by reference in its entirety. The pressure-sensitive diaphragm chip 16A is secured on the top surface of the substrate main unit 15A-1, and the pressure to be measured $P_1$ is applied to one surface of the diaphragm through the small hole 22a. The reference pressure within the airtight container is applied to the surface of the other diaphragm. Furthermore, the pressure-sensitive diaphragm chip 16A is connected electrically to electrical circuitry on the substrate 4 through bonding wires 25a.

The output correcting circuit 17A has a temperature measuring resistive element, not shown, and is a circuit for correcting the pressure to be measured $P_1$ that is detected by the pressure-sensitive diaphragm chip 16A based on the change in the resistance value of this temperature measurement resistive element. This circuit 17A is secured to the top surface of the substrate main unit 15A-1, and is connected electrically to the pressure-sensitive diaphragm chip 16A through bonding wires 26a.

The pressure sensor unit 3B is formed with a structure that is identical to that of the pressure sensor unit 3A, and thus identical structural components and parts are indicated by replacing the respective number suffixes "A," "a," and "-1" with "B," "b," and "-2," respectively, and explanations thereof are omitted.

Figure 3:
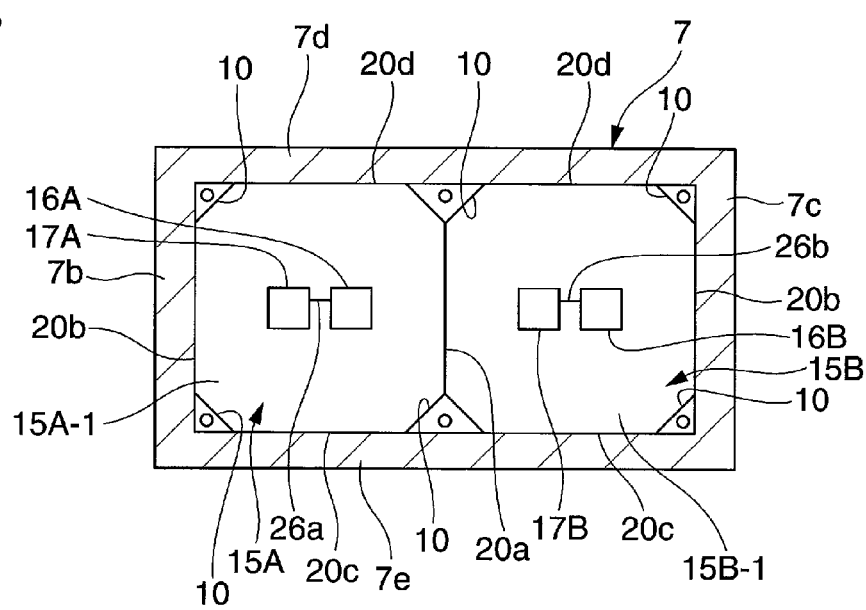
FIG. 3 is a cross-sectional diagram along the section in FIG. 2.

These pressure sensor units 3A and 3B are arranged in intimate contact with each other in the case 7, and thus, as illustrated in FIG. 3, the substrate main units 15A-1 and 15B-1 of the substrates 15A and 15B are positioned by the inner surface of the case and the positioning protruding portions 10. Because of this, the mutually facing side surfaces 20a of the substrate main units 15A-1 and 15B-1 are in contact with each other, and the remaining three side surfaces 20b through 20d are each in contact with the inside surfaces of the case 7. Furthermore, the bottom surfaces of the substrate main units 15A-1 and 15B-1 are in contact with the inside surface of the bottom panel 7a. Furthermore, the pressure connecting portions 15A-2 and 15B-2 of the respective substrates 15A and 15B protrude through O-rings to below the case 7 through the through holes 11a and 11b of the bottom panel 7a to connect, respectively, to the pressure connecting tubes 24A and 24B. Causing the side surfaces 20a of the two substrate main units 15A-1 and 15B-1 to contact each other in this way makes it possible to equalize the temperatures of the two substrates 15A and 15B. Note that the individual pressure sensor units 3A and 3B are contained in the case 7 and are secured by screws.

The substrate 4, after the bonding wires 25a and 25b have been bonded, is contained within the case 7 together with the pressure sensor units 3A and 3B, and is secured, by a plurality of screws, to the positioning protruding portions 10, and lead lines 28 are connected to the connector portion 14 of the lid 8.

Figure 4:
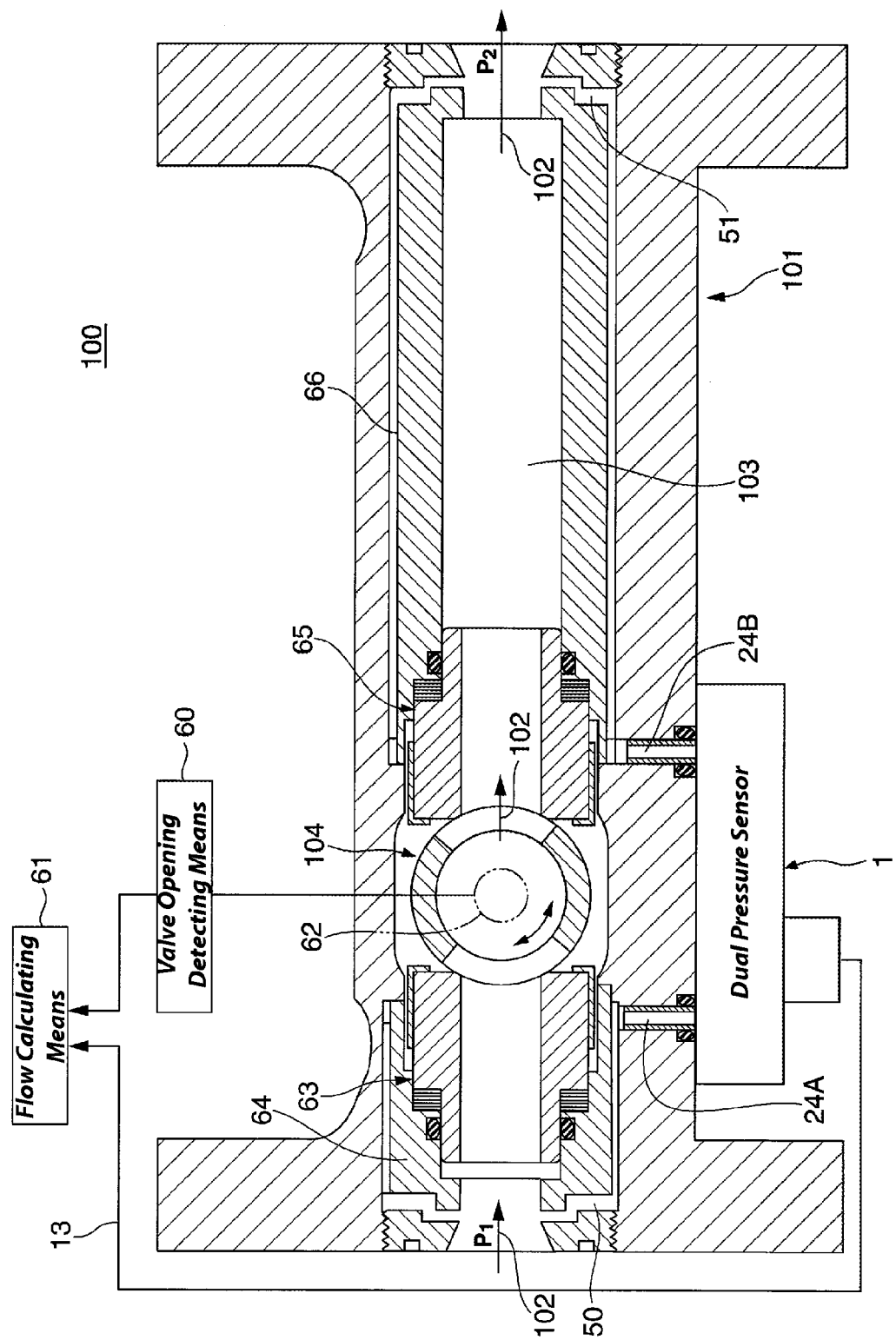
FIG. 4 is a cross-sectional diagram illustrating one example of a flow controlling valve provided with a dual pressure sensor as set forth in the present invention.

This type of dual pressure sensor 1 is used in combination with a flow controlling valve 100, as illustrated in FIG. 4, to be used in measuring the flow of a fluid 102 that flows within the valve body 101.

The flow Q of the fluid 102 that flows within a flow path 103 of the flow controlling valve 100 can be calculated using the following Equation (1). In Equation (1), A is a constant, Cv is a flow factor that is determined by the opening of the valving element, and Δ P is the pressure differential between the upstream side and the downstream side of the fluid.

$$Q = A \cdot Cv \cdot \sqrt{\Delta P} \qquad (1)$$

Typically, in a flow controlling valve 100, the throttling effect will vary depending on the opening of the valving element 104, making it possible to measure flows over a wider range than when compared to a differential pressure flow meter that uses a fixed orifice. Furthermore, it is possible to know the pipe pressure at the flow controlling valve unit, and to use that information in not only measuring the flow, but also in diagnostics such as identifying pressure problems.

When the dual pressure sensor 1 is attached to the flow controlling valve 100, the pressure connecting portion 15A-2 of the substrate 15A for one of the pressure sensor units 3A is connected through the pressure connecting tube 24A and the flow path 50 on the upstream side at the flow controlling valve 100, to apply to the diaphragm of the pressure-sensitive diaphragm chip 16A the pressure to be measured $P_1$ on the upstream side of the valving element 104. The pressure connecting portion 15B-2 of the substrate 15B for the other pressure sensor unit 3B is connected through the pressure connecting tube 24B and the flow path 50 on the downstream side at the flow controlling valve 100, to apply to the diaphragm of the pressure-sensitive diaphragm chip 16B the pressure to be measured $P_2$ on the downstream side of the valving element 104. Because of this, the diaphragms of the respective pressure-sensitive diaphragm chips 16A and 16B deform in accordance with the applied pressures $P_1$ and $P_2$, changing the output voltage of the diffusion-type deformation gauges in accordance with these deformations, to measure the pressures $P_1$ and $P_2$. In this case, the pressure within the airtight container 2 is applied as the reference pressure to the diaphragm, and thus the output voltages of the individual pressure-sensitive diaphragm chips 16A and 16B are the output voltages for the absolute pressures corresponding to the respective pressures to be measured $P_1$ and $P_2$. Furthermore, the output voltages of the individual pressure-sensitive diaphragm chips 16A and 16B are sent to the output correcting circuits 17A and 17B. The output correcting circuits 17A and 17B perform temperature compensation based on the temperature measuring resistive element resistance voltages of the respective circuitry therein, and then send the respective measured pressures $P_1$ and $P_2$, for which the outputs have been corrected, through the outside signal lines 13 to the flow calculating means 61. The flow calculating means 61 then calculate, through a calculation process, the differential pressure Δ P ($P_1 - P_2$) from the respective output-corrected measured pressures $P_1$ and $P_2$ that have been received, and substitute the pressure differential Δ P into the aforementioned Equation 1 to measure the flow Q of the fluid 102 that flows through the flow controlling valve 100. Note that in FIG. 4: 60 is the flow opening detecting means for detecting the opening of the valving element 104; 62 is a valve shaft; 63 is an upstream seat ring; 64 is an upstream retainer; 65 is a downstream seat ring; and 66 is a downstream retainer.

The dual pressure sensor 1, structured in this way, has the pressure connecting portions 15A-2 and 15B-2 disposed protruding integrally from the respective substrates 15A and 15B, making it possible to reduce the part count. Additionally, when the pressure connecting portions 15A-2 and 15B-2 are fabricated from discrete components, as with the pressure sensor disclosed in Japanese Unexamined Patent Application Publication H5-52691, it may be necessary to position them and secured them airtightly to the bottom of the case 7, but in the dual pressure sensor 1 according to the present invention, the pressure connecting portions 15A-2 and 15B-2 merely need protrude through a seal component, such as an O-ring, through the through holes 11a and 11b, simplifying the assembly operations for the pressure connecting portions 15A-2 and 15B-2, enabling an improvement in the sensor assembly productivity.

Additionally, because the dual pressure sensor 1 as set forth in the present invention is provided with two individual and independent pressure sensor units 3A and 3B, if either one should fail then it is necessary to swap only the sensor unit that has failed, and not necessary to swap the sensor in its entirety, which has economic benefits.

While the invention has been particularly shown and described with reference to a number of preferred embodiments thereof, it will be understood by those skilled in the art that various changes in form and details may be made therein without departing from the spirit and scope of the invention. Accordingly, the invention is to be limited only by the scope of the claims and their equivalents.

The invention claimed is:

1. A dual pressure sensor comprising:
an airtight container having two through holes and having a pressure reference chamber formed on the inside thereof; and
two pressure sensor units, disposed within the pressure reference chamber, for detecting two pressures to be measured; wherein:
the two pressure sensor units each comprise:
at least one substrate and
at least one pressure-sensitive diaphragm chip for detecting respective pressures to be measured by converting into electrical signals displacements of diaphragms of the respective pressure-sensitive diagram chips due to the respective application of the pressures to be measured; and
the at least one substrate of each individual pressure sensor unit comprises:
a substrate main unit that has a small hole and has a connecting duct formed therein, and wherein the pressure-sensitive diaphragm chip is secured so as to block the small hole; and
a pressure connecting portion, formed integrally with the substrate main unit and protruding therefrom, having a pressure connecting hole for connecting to the connecting duct, wherein one end extends to the outside of the airtight container from the two through holes, to connect the individual pressure to be measured through the connecting duct to the diaphragm of the pressure-sensitive diaphragm chip; wherein
the opposing side faces of each of the substrate main units are in contact with each other.

2. The dual pressure sensor of claim 1, comprising:
positioning protruding portions for positioning the two pressure sensor units; and wherein:

the pressure connecting portions of the substrates pass through the two through holes of the airtight container and the substrate main units are positioned by the positioning protruding portions so as to be lined up with the opposing side faces of the substrate main units in contact with each other.

3. The dual pressure sensor of claim 1, wherein:

the pressure to be measured, which is connected from the pressure connecting hole of the pressure connecting portion, is connected to the pressure-sensitive diaphragm chip through a connecting duct with a hole size that is larger than the hole size of the pressure connecting hole, and through a small hole with a hole size that is smaller than the hole size of the connecting duct.

4. The dual pressure sensor of claim 2, wherein:

the pressure to be measured, which is connected from the pressure connecting hole of the pressure connecting portion, is connected to the pressure-sensitive diaphragm chip through a connecting duct with a hole size that is larger than the hole size of the pressure connecting hole, and through a small hole with a hole size that is smaller than the hole size of the connecting duct.

5. The dual pressure sensor of claim 2, wherein:

the pressure connecting portions of the substrates pass through seal materials at the two through holes of the airtight container.

6. The dual pressure sensor of claim 4, wherein:

the pressure connecting portions of the substrates pass through seal materials at the two through holes of the airtight container.

7. The dual pressure sensor of claim 1, wherein an output correcting circuit is disposed on the top surface of the substrate main unit.

8. The dual pressure sensor of claim 2, wherein an output correcting circuit is disposed on the top surface of the substrate main unit.

9. The dual pressure sensor of claim 3, wherein an output correcting circuit is disposed on the top surface of the substrate main unit.

10. The dual pressure sensor of claim 4, wherein an output correcting circuit is disposed on the top surface of the substrate main unit.

11. The dual pressure sensor of claim 5, wherein an output correcting circuit is disposed on the top surface of the substrate main unit.

12. The dual pressure sensor of claim 6, wherein an output correcting circuit is disposed on the top surface of the substrate main unit.

13. The dual pressure sensor of claim 1, wherein the two pressure sensor units each can be replaced independently.

14. The dual pressure sensor of claim 2, wherein the two pressure sensor units each can be replaced independently.

15. The dual pressure sensor of claim 3, wherein the two pressure sensor units each can be replaced independently.

16. The dual pressure sensor of claim 4, wherein the two pressure sensor units each can be replaced independently.

17. The dual pressure sensor of claim 5, wherein the two pressure sensor units each can be replaced independently.

18. A dual pressure sensor of claim 6, wherein the two pressure sensor units each can be replaced independently.

* * * * *